United States Patent
Olson

(10) Patent No.: US 7,949,198 B2
(45) Date of Patent: May 24, 2011

(54) FAST RESPONSE DISCRETE TIME INFINITE IMPULSE RESPONSE (IIR) FILTER

(75) Inventor: Scot Olson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1000 days.

(21) Appl. No.: 11/769,427

(22) Filed: Jun. 27, 2007

(65) Prior Publication Data

US 2009/0002557 A1 Jan. 1, 2009

(51) Int. Cl.
 G06K 9/40 (2006.01)
 G06F 3/038 (2006.01)
(52) U.S. Cl. ........................ 382/260; 345/204
(58) Field of Classification Search .......... 382/254–275; 345/44–104, 204–215
 See application file for complete search history.

(56) References Cited

U.S. PATENT DOCUMENTS

| | | | | |
|---|---|---|---|---|
| 6,199,084 B1* | 3/2001 | Wiseman | | 708/304 |
| 6,330,371 B1* | 12/2001 | Chen et al. | | 382/260 |
| 6,459,817 B1* | 10/2002 | Matsushiro | | 382/251 |
| 6,600,495 B1* | 7/2003 | Boland et al. | | 345/660 |
| 6,671,071 B1* | 12/2003 | Kletter | | 358/1.9 |
| 6,677,994 B1* | 1/2004 | Kobayashi | | 348/252 |

* cited by examiner

*Primary Examiner* — Manav Seth

(74) *Attorney, Agent, or Firm* — Ingrassia Fisher & Lorenz, P.C.

(57) ABSTRACT

An infinite impulse response (IIR) filter provides fast response time without significant effects of ringing or overshoot. In a first step, an input signal is received and a preliminary output signal is computed based upon at least the input signal and a prior output signal. The preliminary output signal is compared to the input signal, and if the preliminary output signal and the input signal differ by more than a significant amount, the input signal is provided as the output signal. Otherwise, the preliminary output signal can be provided as the output signal. Such a filter be readily implemented in software or other programmable logic, and may have particular utility in preserving the contrast in a filtered video image represented by discrete digital data within a display system.

20 Claims, 4 Drawing Sheets

FAST RESPONSE DISCRETE TIME INFINITE IMPULSE RESPONSE (IIR) FILTER

TECHNICAL FIELD

The present disclosure generally relates to impulse filters, and more particularly relates to a discrete time infinite impulse response (IIR) filter with fast response time.

BACKGROUND

A "filter" is any circuit, logic or other construct that separates data, signals, or other material in accordance with specified criteria. In electrical engineering, for example, a "bandpass" filter is any device or logic that removes components of an input signal that lie outside of a particular frequency range. A "notch" filter, on the other hand, removes only certain frequencies from the input signal, while generally leaving the remaining frequencies intact. Similarly, a "low pass filter" can be used to remove high frequency components from an input signal, and a "high pass filter" can be used to remove low frequency components.

Filters can be implemented in many different ways. Traditional analog filters can be constructed from conventional resistor-capacitor circuitry, for example, to pass or block electrical signals having certain frequencies. More recently, signal filters have been implemented digitally, using a digital signal processor or programmable array circuit of any sort. These digital filters can often be configured and implemented in software, thereby allowing for a very high level of customization and for relative ease in implementation. Although digital filtering techniques have become very sophisticated, it is nevertheless desirable to improve their performance without significantly increasing complexity.

Accordingly, it is desirable to provide systems and techniques for effectively and efficiently implementing a digital filtering technique. Other desirable features and characteristics will become apparent from the subsequent detailed description of the invention and the appended claims, taken in conjunction with the accompanying drawings and this background of the invention.

BRIEF SUMMARY

An infinite impulse response (IIR) filter provides fast response time without significant effects of ringing or overshoot. In a first step, an input signal is received and a preliminary output signal is computed based upon at least the input signal and a prior output signal. The preliminary output signal is compared to the input signal, and if the preliminary output signal and the input signal differ by more than a significant amount, the input signal is provided as the output signal. Otherwise, the preliminary output signal can be provided as the output signal. Such a filter may have particular utility in preserving the contrast in a filtered video image represented by discrete digital data.

Other embodiments include other lamps or displays incorporating structures and/or techniques described herein. Additional detail about various example embodiments is set forth below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely example in nature and is not intended to limit the invention or the application and uses of the invention. Furthermore, there is no intention to be bound by any theory presented in the preceding background of the invention or the following detailed description of the invention.

According to various exemplary embodiments, the response time of a discrete time infinite impulse response (IIR) filter is greatly improved by simply replacing computed output values with measured input values in the event that the output and input differ by a significant amount. A "significant amount" in this case can refer to an amount that passes a threshold value, or any other amount that is appropriate for the particular implementation. The filtering techniques described herein may be readily implemented in software or other logic present in any digital storage medium, and could be incorporated into any sort of filtering scheme applied in any environment. In one exemplary application, a fast response digital IIR filter can be used to remove noise components found in video signals or the like that are viewed on an electronic display.

Figure 1:
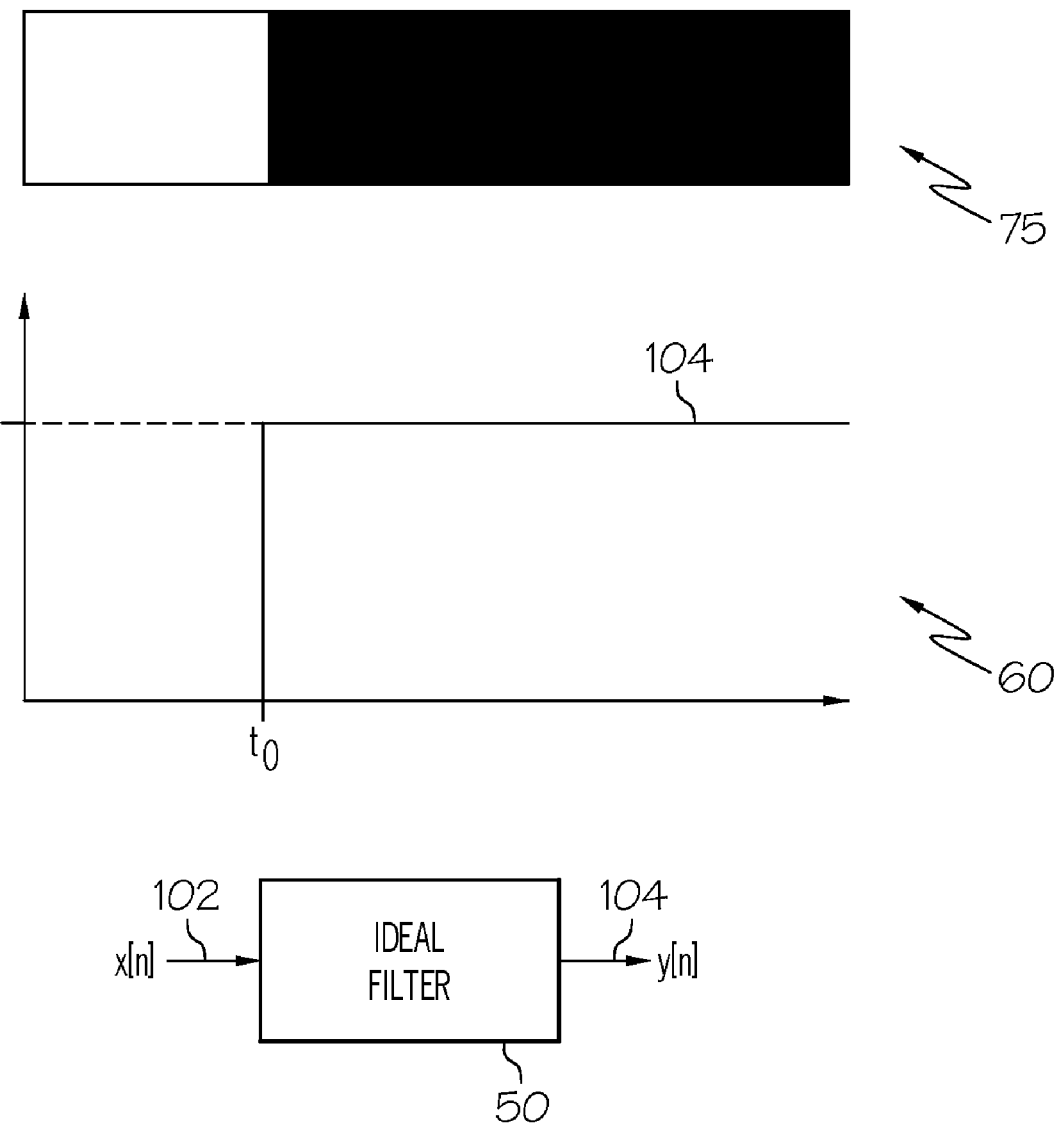
FIG. 1 is a block diagram of an ideal impulse response filter.

With initial reference to FIG. 1, an exemplary ideal filter 50 suitably produces a filtered output signal 104 in response to any input signal 102. In various embodiments, input signal 102 and output signal 104 are discrete in time, and may therefore be represented as a series of discrete values x[n] and y[n], respectively. Filter 50 is any type of notch, comb, bandpass, low-pass, high-pass or other filter capable of removing undesired components (e.g. noise) from input signal 102. Other than removing certain frequency components, however, it is generally desired that the output 104 of filter 50 closely track the input 102, with little or no time domain delay or noise. Plot 60, for example, shows an ideal response to an impulse of magnitude "1" applied at input 102 at time $t_0$. The ideal output 104 very closely tracks the input, resulting in the trace shown in plot 60. In a display setting, this sharp transition from one state to another can be seen as very sharp contrast, as evidenced in representation 75. Representation 75 shows that adjacent pixels rapidly transition from light to dark, thereby providing excellent contrast.

Figure 2A:
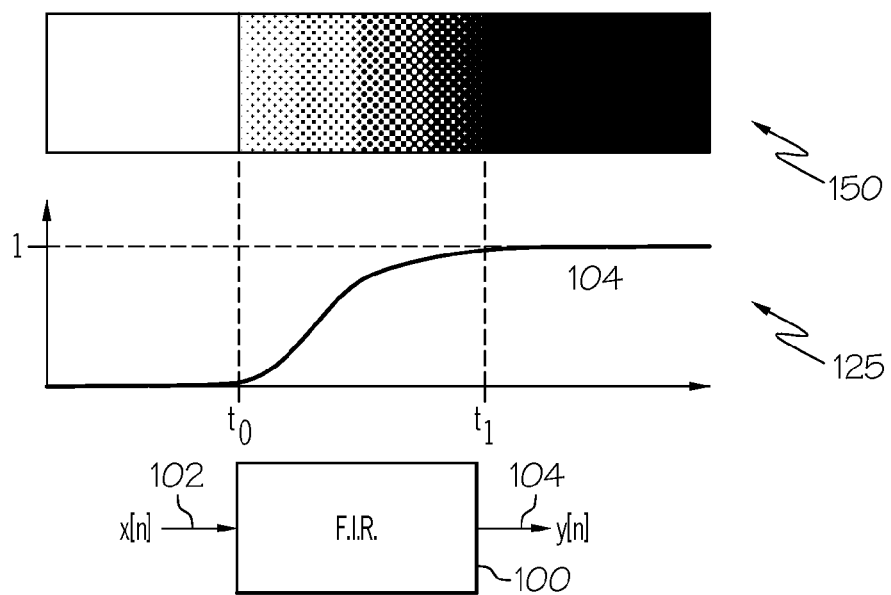
FIG. 2(a) is a block diagram of a finite impulse response (FIR) filter.

With reference now to FIG. 2(a), an exemplary finite impulse response (FIR) filter 100 also accepts an input signal x[n] 102 and provides an output signal y[n] 104 as appropriate. Like the ideal filter 50 above, output signal 104 from FIR 100 is generally designed to track the input signal 102, but with certain components (e.g. noise or other undesired frequency components) removed. FIR filters 100 can be designed in accordance with any number of well-known or subsequently developed techniques. Generally speaking, however, FIR filters 100 are designed to provide output signal 104 solely as a function of current and prior input signals 102.

That is, FIR filters 100 generally do not contain feedback components such as those found in infinite impulse response (IIR) filters described below.

In most digital embodiments, each output signal 104 is determined based upon prior input signals 102, with the various input and output signals 102 and 104 being discrete in time. Input signals 102 may be digitally sampled from an analog source, for example, or may be any other sort of digital data as appropriate. These digital signals 102 and 104 may be stored in any memory or other storage device as appropriate for subsequent retrieval and/or further processing.

Mathematically speaking, FIR filter 100 can be summarized for digital filters as follows:

$$y[n] = \sum_{s=0}^{r} \alpha_s x[n-s] \quad (1)$$

wherein "n" refers to the sequence number, and "α" refers to any coefficient multiplier. Certain coefficient multipliers may be zero or very slight in many embodiments, and many terms of the summation (e.g. terms older than some number of samples) may be ignored in many embodiments. Equation (1) is provided as one exemplary illustration; other FIR filter techniques could be used in any equivalent embodiment.

Generally speaking, FIR filters 100 can provide accurate and stable response characteristics, but these filters are known for relatively slow response times. As shown in plot 125, for example, an input pulse 102 of magnitude "1" applied at time zero ($t_0$) does not result in an equivalent output "1" until some time after the input signal is applied. This time is shown in plot 125 as time "$t_1$". In practice, this delay can have adverse effects in certain applications. In a video display, for example, the delay in transition between low and high states can affect the contrast of the image presented on the display. In the representation 150 shown in FIG. 1, for example, the pixel transition from light to dark can be "clouded" with intermediate "gray" effects, thereby detracting from the quality of the image.

Figure 2B:
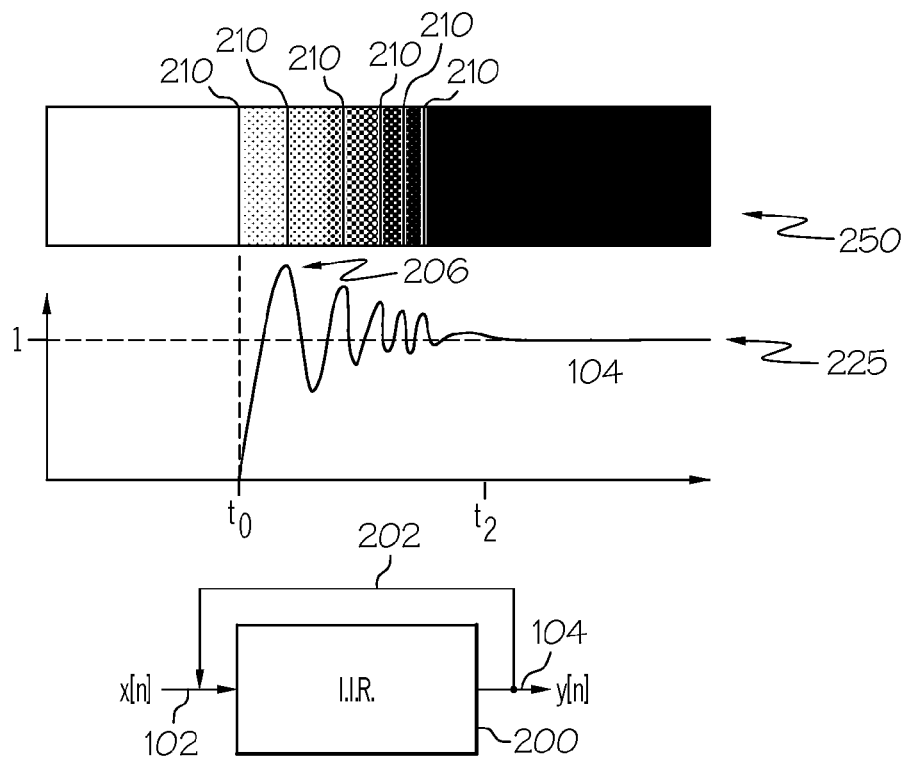
FIG. 2(b) is a block diagram of an infinite impulse response (IIR) filter.

With reference now to FIG. 2(b), an infinite impulse response (IIR) filter 200 is capable of improving upon the response time issue inherent with FIR filters 100. Like the FIR filter 100, the IIR filter 200 receives a series of input signals 102, and produces any number of output signals 104 in response thereto. The input and output signals may be digital values, such as any values sampled from any analog source, or the like. Unlike the FIR filter, however, the IIR filter 200 incorporates feedback 202, resulting in a mathematical model summarized as follows:

$$y[n] = \sum_{r=0}^{p} \alpha_s x[n-r] + \sum_{s=1}^{q} \beta_s y[n-s] \quad (2)$$

wherein "n" refers to the sequence number, and "α" and "β" refer to any coefficient multipliers, and "p" and "q" refer to the number of input and output values (respectively) that are available. The particular coefficients selected will determine the particular features and parameters of the digital filter, and these coefficients can be designed using any number of well-known or subsequently developed techniques such as impulse invariance or bilinear transformation of a given analog filter transfer function. As with Equation (1) above, certain coefficient multipliers in Equation (2) may be zero or very slight in many embodiments, and many embodiments may ignore certain terms of the summation (e.g. terms older than some number of samples). Also, Equation (2) is intended as one exemplary illustration; other IIR filter techniques or models could be used in any equivalent embodiment.

IIR filters 200 generally provide much faster response time than FIR filters 100, but with the potential drawback of "ringing", "overshoot" and/or increased risk of instability. Plot 225, for example, shows an impulse response 104 that initially overshoots the target value (at point 206), then oscillates about the target value for several iterations before settling on the desired output 104 around time $t_2$. This "ringing" or "overshoot" around point 206 results from the feedback 202 in filter 200. While the use of feedback 202 improves the response time of IIR filter 200 in comparison to FIR filter 100, then, it does so with the potential drawback of under-damped signals.

These under-damped signals (e.g. around point 206 of plot 225) can have undesirable effects in practice. In the representation 250 shown in FIG. 2, for example, a ringing in signal 104 can produce undesirable lines 210 in a display image, thereby degrading the quality of the image. In display applications and the like, then, it is desirable to provide fast response time without resulting in undesirable ringing, as both of these effects degrade the quality of the image viewed on the display. The filter would thus approach the time response of a step function to be "ideal"

Figure 3:
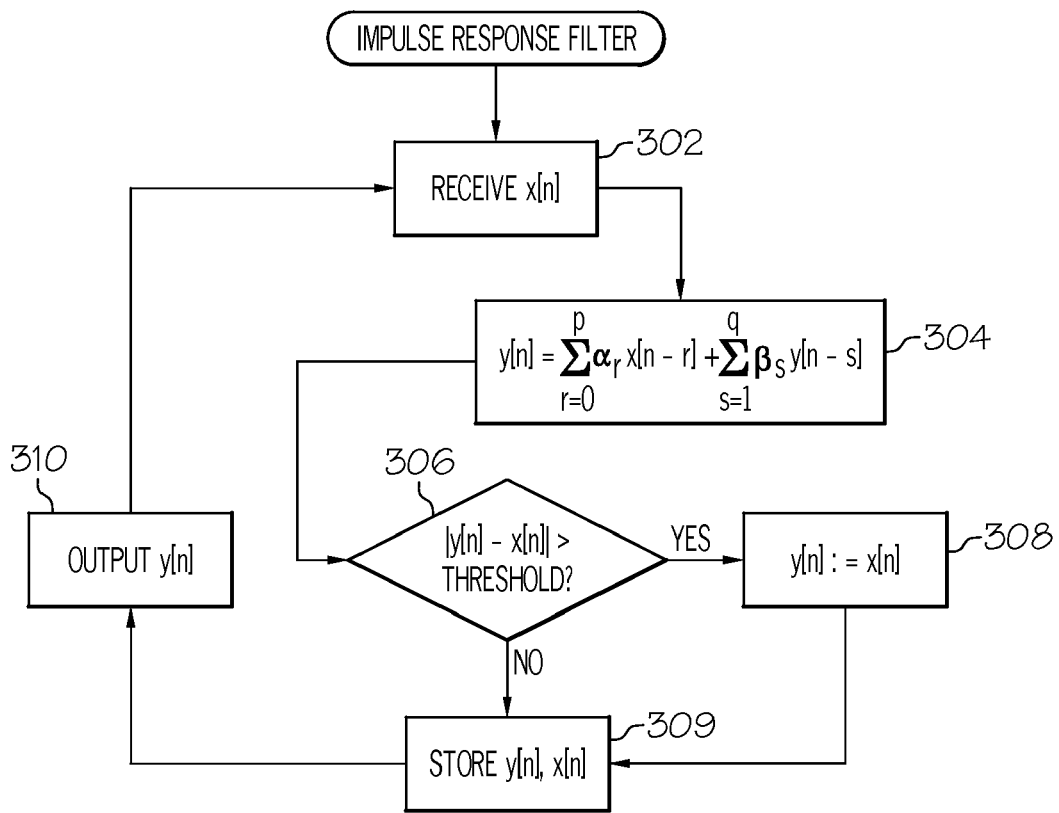
FIG. 3 is a flowchart showing an exemplary technique for improving the response time of a discrete time impulse response filter.

With reference now to FIG. 3, an exemplary technique for reducing or eliminating undesirable transients in an IIR filter suitably includes the broad steps of receiving an input signal 102 (step 302), processing the input signal 102 to determine a preliminary output signal 104 (step 304), comparing the generated output signal to the input signal (step 306), and then if the preliminary output signal and the input signal differ by more than a significant amount, providing the input signal as the output signal (step 308), and otherwise providing the preliminary output signal as the output signal (step 310) as appropriate. Process 300 may repeat any number of times for subsequent input values 102.

Process 300 may be implemented in any manner. In various embodiments, process 300 is implemented with a conventional digital computer, such as any computer having any sort of processor, controller, microcontroller, digital signal processor, programmed array or other programmable logic in association with any sort of digital memory (e.g. any sort of random access, read-only, flash or other memory). In various embodiments, process 300 is implemented in software or firmware embedded within a microcontroller driven system, although embodiments could implement equivalent processes 300 in hardware, software, firmware, discrete or integrated logic, or any combination of logic as appropriate. The various logic steps shown in FIG. 3 may be implemented as separate programming steps, modules or routines in certain embodiments. In other equivalent embodiments, however, the actual logic shown in FIG. 3 may be modified or differently organized into different actual programming instructions.

Step 302, then, suitably includes receiving any input value 102 in any manner. Input value 102 may be any digital representation of an input value (e.g. a brightness level, pixel activation signal, or any other signal representing any other quantity or value) as appropriate. Step 302 may also include storing the input value 102 in memory, although in alternate embodiments input value 102 is obtained in step 302 from a digital memory, and therefore need not be separately stored.

Step 304 involves processing the various input and/or output values 102 and 104 as appropriate to obtain a preliminary output value 104. Equation (2) above, for example, contains a mathematical description of an exemplary IIR filter 200 that simply sums the products of input values 102 and prior output values 104 with various coefficients to arrive at an appropriately-filtered output value 103. These values may be retrieved from digital memory or the like and processed using conventional digital signal processing techniques.

If the preliminary output value y[n] 104 computed in step 304 differs substantially from the input value x[n] 102 received in step 302, it can be readily ascertained that filter 200 is in a "ringing", "overshoot" or other under-damped state (step 306). That is, if a substantial difference exists between the input value 102 and the computed output value 104, the value of output value 104 can be justifiably questioned. A "substantial difference" in this case refers to any difference that can be determined to be greater than simple variation in the input signal. Such an amount may be based upon a predetermined threshold value, for example, that is determined based upon noise levels in the input signal 102 and/or other factors as appropriate. In other embodiments, "substantial difference" could refer to differences from average or historical values, or other factors as appropriate.

Figure 4:
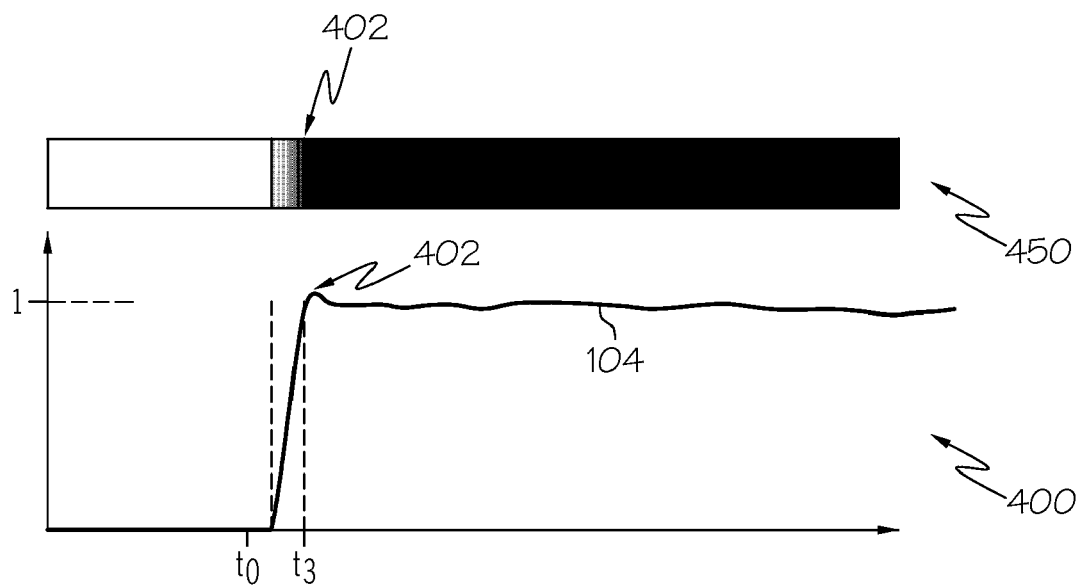
FIG. 4 is a plot of an exemplary impulse response obtained with the technique described in FIG. 3.

If a substantial difference does exist between input value x[n] 102 and output value y[n] 104, then the preliminary output value y[n] 104 is replaced by input value x[n] 102 received in step 302 (step 308). This replacement eliminates identified "outlying" values 104 from subsequent computations in step 304, thereby improving filter stability and responsiveness. This also significantly smoothes the impulse response of filter 200, as shown in plot 400 in FIG. 4. In a display application, for example, signal contrast as shown in illustration 450 is significantly improved over that of illustrations 150 and 250, with much shorter response time ($t_3$) and without significant effects of ringing or overshoot such as lines 210 present in representation 250 above. The resulting output value y[n] may then be stored in digital memory and/or mass storage (step 309) as appropriate. Input values x[n] may also be stored in tandem with output values 104, or in separate databases or data structures as appropriate. Input values 102 and/or output values 104 may also be displayed, stored and/or otherwise output for subsequent processing in any manner (step 310).

Figure 5:
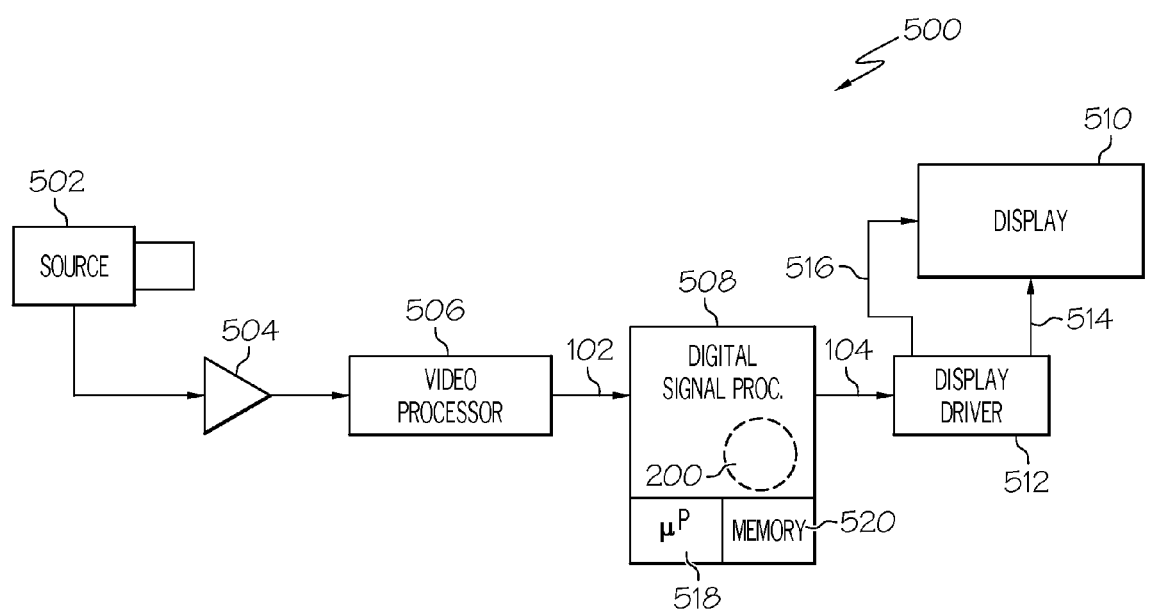
FIG. 5 is a block diagram of an exemplary video display system incorporating a fast IIR filter.

With reference now to FIG. 5, an exemplary system implementation of an IIR filter 200 using the techniques of process 300 is shown. This system 500 in FIG. 5 is shown as a video processing system that provides a display 510 of a received analog image, although equivalent concepts could be applied in any number of other environments and settings.

System 500 shown in FIG. 5 suitably includes a camera or other data source 502, a pre-amplifier 504, a video processor 506, and a digital signal processor 508 and/or display driver 512 as appropriate. Video imagery is obtained from source 502, amplified as desired at amplifier 504, and formatted as appropriate at video processor 506 to create input signals x[n] 102. In various embodiments, video processor 506 performs analog-to-digital (A/D) conversion, as well as formatting of raw video data, etc. Often, signal noise can enter into data prior to (or during) A/D conversion due to "virtual grounds" or other effects present within video processor 506. These noise effects can produce lines or other undesirable effects in display 510.

A digital filter 200 (e.g. a notch filter or the like) executing within signal processor 508 and/or display driver 512 can be provided to remove the effects of the noise within input data 102. Such a filter 200 may reside as computer-executable instructions in any compiled, interpreted and/or other format understandable by processor 518, for example. These instructions may be stored in any type of digital storage medium, including any type of random access, read-only, flash or other memory 520, or in any sort of mass storage, including any type of magnetic, optical, removable and/or non-removable media.

Exemplary filters 200 are described above, particularly in reference to FIGS. 2(b) and 3. By employing an IIR filter 200 using the data correction techniques of process 300, output data 104 can be filtered while retaining the contrast of the displayed image. This filtered data 104 can therefore be processed as appropriate by a display driver 514 or the like to produce row and column drive signals 514, 516, and/or other suitable signals for producing the desired imagery on display 510. As noted above, the particular filters and filtering techniques described herein are not limited to video display applications, and indeed may find wide applicability across a wide array of equivalent digital signal processing and other applications.

While at least one example embodiment has been presented in the foregoing detailed description of the invention, it should be appreciated that a vast number of variations exist. It should also be appreciated that the example embodiment or example embodiments are only examples, and are not intended to limit the scope, applicability, or configuration of the invention in any way. Rather, the foregoing detailed description will provide those skilled in the art with a convenient road map for implementing an example embodiment of the invention. It should be understood that various changes may be made in the function and arrangement of elements described in an example embodiment without departing from the scope of the invention as set forth in the appended claims and their legal equivalents.

What is claimed is:

1. A method of filtering an input signal to produce an output signal, the method comprising the steps of:
   receiving the input signal;
   computing a preliminary output signal based upon at least the input signal and a prior output signal;
   comparing the preliminary output signal to the input signal; and
   if the preliminary output signal and the input signal differ by a significant amount, providing the input signal as the output signal, and otherwise providing the preliminary output signal as the output signal.

2. The method of claim 1 further comprising the step of providing the output signal for presentation on an electronic display.

3. The method of claim 1 wherein the computing step comprises applying a digital filter.

4. The method of claim 3 wherein the digital filter is a band pass filter.

5. The method of claim 3 wherein the digital filter is a notch filter.

6. The method of claim 3 wherein the digital filter is a low pass filter.

7. The method of claim 3 wherein the digital filter is a high pass filter.

8. The method of claim 3 wherein the digital filter is described by:

$$y[n] = \sum_{r=0}^{p} \alpha_s x[n-r] + \sum_{s=1}^{q} \beta_s y[n-s]$$

wherein "y[n]" refers to the preliminary output signal, "x[n]" refers to the input signal, "n" refers to a sequence number, "α" and "β" refer to any coefficient multipliers.

9. The method of claim 1 wherein the providing step comprises storing the output signal in a digital memory.

10. The method of claim 1 further wherein the providing step comprises outputting the output signal.

11. The method of claim 1 wherein the significant amount corresponds to a threshold value.

12. A non-transitory digital storage medium having computer-executable instructions stored thereon configured to filter an input signal to produce an output signal, wherein the instructions comprise:
means for receiving the input signal;
means for computing a preliminary output signal based upon at least the input signal and a prior output signal;
means for comparing the preliminary output signal to the input signal; and
means for providing the input signal as the output signal if the preliminary output signal and the input signal differ by a significant amount, and for otherwise providing the preliminary output signal as the output signal.

13. A display system comprising:
a display configured to present an image to a viewer;
a display driver configured to provide a drive signal to the display based upon a filtered output signal;
a digital signal processor configured to receive an input signal comprising a digitized representation of the image and to apply a digital filter to the input signal to produce the filtered output signal provided to the display driver, wherein the digital signal processor is further configured to compute a preliminary output signal based upon at least the input signal and a prior output signal, to compare the preliminary output signal to the input signal, and if the preliminary output signal and the input signal differ by a significant amount, to provide the input signal as the filtered output signal, and to otherwise provide the preliminary output signal as the filtered output signal.

14. The display system of claim 13 further comprising a video processor configured to receive a video signal from an input source and to produce the digitized representation of the image from the video signal.

15. The display system of claim 13 wherein the digital filter is configured to remove noise in the input signal.

16. The display system of claim 13 wherein the digital filter is a notch filter.

17. The display system of claim 13 wherein the digital filter is a band pass filter.

18. The display system of claim 13 wherein the digital filter is a low pass filter.

19. The display system of claim 13 wherein the digital filter is a high pass filter.

20. The display system of claim 13 wherein the digital filter is described by:

$$y[n] = \sum_{r=0}^{p} \alpha_s x[n-r] + \sum_{s=1}^{q} \beta_s y[n-s]$$

wherein "y[n]" refers to the preliminary output signal, "x[n]" refers to the input signal, "n" refers to a sequence number, "α" and "β" refer to any coefficient multipliers.

* * * * *